Feb. 24, 1931.  A. E. DE KONING  1,793,544
CUT-OFF SAW MACHINE
Filed June 3, 1929   4 Sheets-Sheet 2
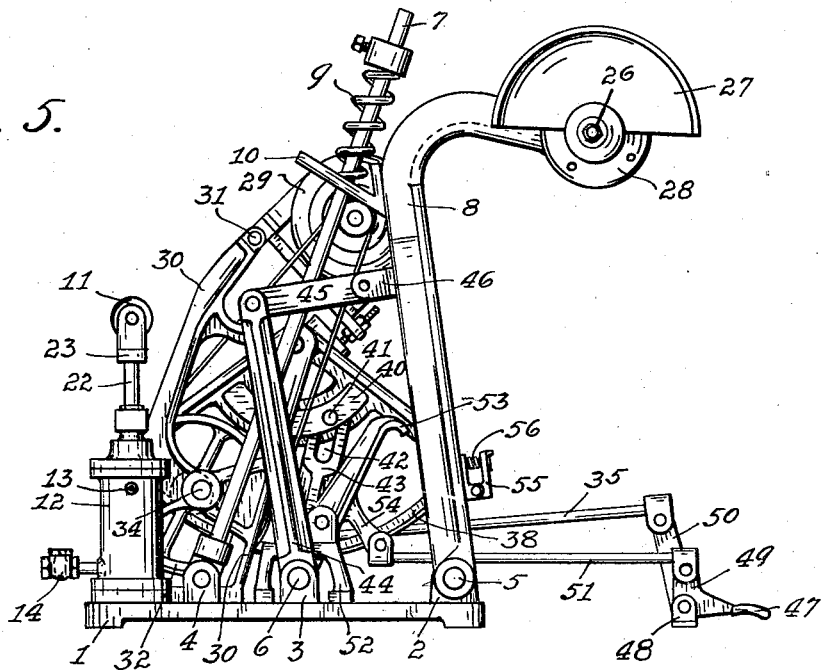
Fig. 5.
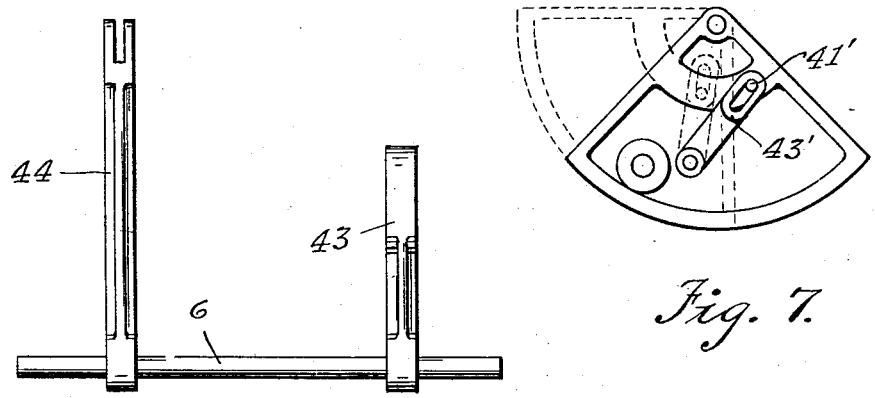
Fig. 6.
Fig. 7.
INVENTOR,
Arthur E. De Koning INVENTOR,
Arthur E. de Koning Feb. 24, 1931.  A. E. DE KONING  1,793,544
CUT-OFF SAW MACHINE
Filed June 3, 1929  4 Sheets-Sheet 4

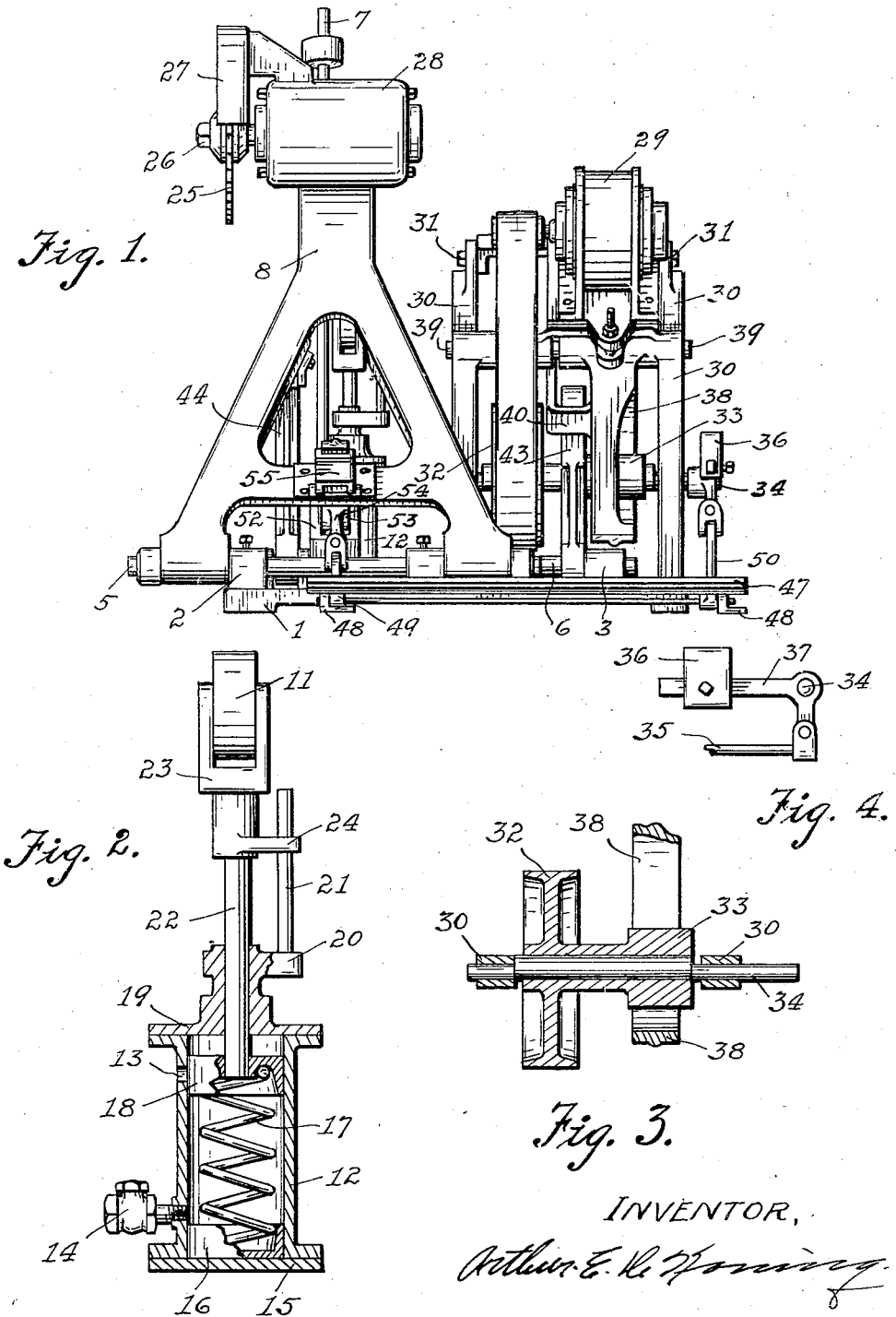

Inventor
Arthur E. De Koning

Patented Feb. 24, 1931

1,793,544

UNITED STATES PATENT OFFICE

ARTHUR E. DE KONING, OF PORTLAND, OREGON

CUT-OFF SAW MACHINE

Application filed June 3, 1929. Serial No. 368,030.

My invention relates to improvements in cut-off saw machines in which the saw and its mandrel are carried through the work upon a pivotally mounted carriage; more particularly to means for propelling such a carriage in its oscillatory movement by power and for controlling nicely its operation.

The principal object of my invention is to provide for the efficient operation of a machine of this type in which the saw is driven by a direct connected motor of considerable weight and power, by enhancing the celerity of movement of the carriage beyond that possible by the employment of human effort.

A second object is to provide means for dissipating that portion of the energy, so imparted to the carriage by a source of power, not used to propel the saw through the cut, so that this energy which might be represented by either momentum of the saw carriage assembly, or potential energy of a compressed spring, will not operate to enhance the speed, or frequency of oscillation beyond that safe and practicable to control.

A third object is to provide for a multiplicity of functions of certain parts and thereby to conserve floor space, material, workmanship and weight.

Other objects and advantages of my invention are apparent in the following discourse wherein the significance of the reference numerals in the accompanying drawings, details of construction and operation of a typical device embodying the invention, and its particular advantages and utility are explained.

Figure 1 represents a front view of the complete machine.

Figure 2 represents a view of the energy dissipating device partly in elevation and partly in vertical section.

Figure 3 represents a view, in axial section, of a fragment of the device employed to transmit power from a motor to a pivoted sector by the frictional contact therewith of a driven friction roll.

Figure 4 represents a view of the counterweighted bell-crank and fragment of the control rod attached to the eccentric spindle of the friction roll and driving pulley, employed to rotate said spindle in one direction by an impluse of the control rod, and in the other direction by the descent of the counterweight.

Figure 5 represents a side view of the entire machine but without the saw blade, in elevation when the saw is extended.

Figure 6 represents a view of a rocker-shaft assembly which serves to transmit the actuating force for the saw carriage from one side of the machine to the other.

Figure 7 is a diagram illustrative of the manner in which a variable force is derived to counterbalance the mass of the saw carriage in its movement about its pivot.

Figure 8:
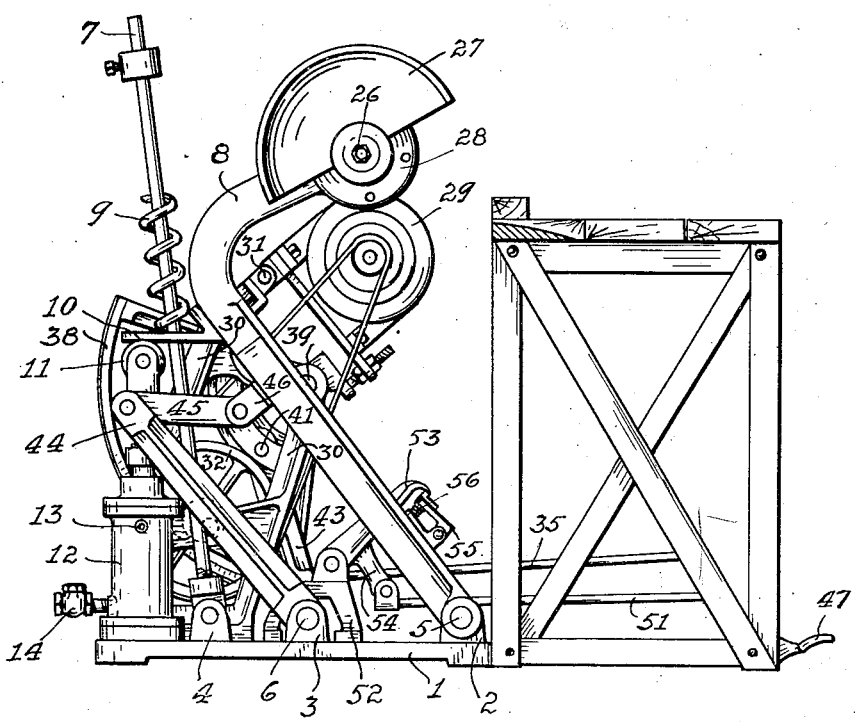
Figure 8 represents a side view of the complete machine without the saw blade, when the saw is retracted or withdrawn from the work, and a work table of the kind employed with the machine.
Figure 9:
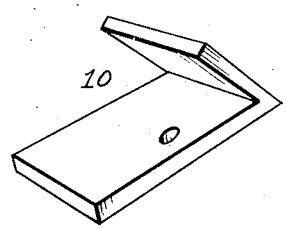
Figure 9 represents a perspective view of a member not otherwise shown in more than one aspect, the function of which will be explained subsequently.
Figure 10:
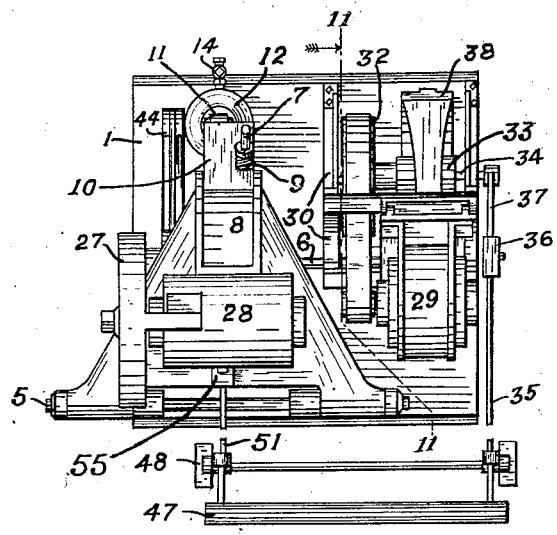
Figure 10 represents a plan view of the entire machine.
Figure 12:
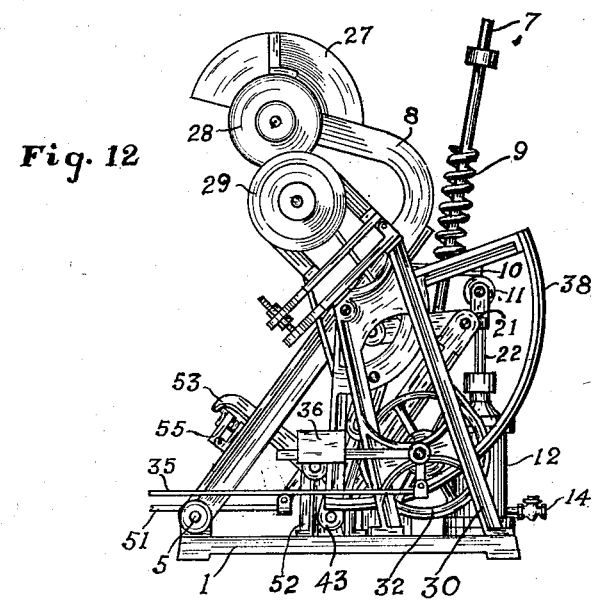
Figure 12 represents a view of the reverse side of the entire machine in elevation.
Figure 11:
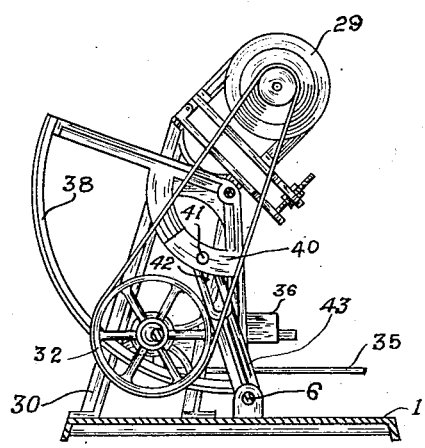
Figure 11 represents a view of a section of the machine taken on the line 11—11 of Figure 10.

The reference numeral 1 indicates the base of the machine formed with protuberances such as 2, 3, and 4, adapted to support the shaft 5 rigidly, to serve as journals for the rocker-shaft 6, and the pivotal mounting of the rod 7, as well as providing for the securance of the other members in proper relationship.

A rigid carriage 8 journaled upon the shaft 5 is limited in its forward motion by a reflecting spring 9 mounted upon the rod 7, pivotally attached to the base 1 and provided with a collar secured at its upper end to retain said spring upon the rod when engaged by the member 10 through which the rod passes, and in its backward motion by the energy dissipating device shown in Figure 2, the roller 11 of which also engages the member 10.

The energy dissipating device represented by Fig. 2 consists of a cylinder 12 in the upper part of which a hole 13 (Figures 5 and 8) is drilled to provide communication between the atmosphere and the upper end of the cylinder and to the lower end of which a check valve 14 is fitted to permit the ingress only of the atmosphere; a lower head 15 formed with a cup 16; a reflecting spring 17 seating in the cup 16 and extending into a cupped piston 18; an upper head 19 formed with a bracket 20 rigidly supporting the vertical slide-rod 21, and through which the piston rod 22 passes; and a head 23 formed with a slide 24 engaging the slide-rod 21 and supporting the roller 11. The whole of this assembly is attached rigidly to the base 1 at the lower head 15.

The assembly, comprising the saw 25 with its mandrel 26, guard 27, and driving motor 28, is rigidly mounted on the carriage 8.

A second motor 29, hinged at 31 to a supporting frame 30 therefor rigidly secured to the base 1, is belted to the pulley 32 in turn rigidly attached to the friction roll 33. The pulley 32 with attached friction roll 33 is journaled upon the eccentric shaft 34. The eccentric shaft 34 is journaled in the frame 30 at each end in which it is actuated in rotation by the control rod 35 or counterweight 36 through the bell-crank 37 rigidly attached to the eccentric shaft 34.

A sector 38 pivotally mounted in the frame 30 upon the shaft 39 encompasses the eccentric shaft 34 with its friction roll 33 and is formed with a frictional surface inside its rim to engage with the friction roll 33, and an extended portion 40 to support the outer end of a pin 41 rigidly secured to the sector.

This pin 41, on the sector, engages a slot 42 in the variable lever 43, in turn rigidly mounted on the rocker-shaft 6. At the other end of the rocker-shaft 6 a lever 44 is rigidly secured. A link 45 connects the upper end of the lever 44 to the carriage 8 provided with the piece 46 rigidly attached.

The control mechanism comprises a treadle 47, pivotally mounted upon its base 48 formed with two levers 49 and 50 at opposite ends to which the control rods 51 and 35 are attached respectively.

A standard 52 secured to the base 1 is the support for the hook 53 formed with a depending lever 54, in turn pivotally connected to the control rod 51. Secured to the carriage 8 is a resilient stop 55 to engage the hook 53; the element of resiliency being furnished by springs as 56.

The description of the operation of the machine is confined to a description of the operation of the carriage in its oscillatory movement since the actual cutting-off of wood by swinging saws is at this time well understood, and the peculiarities of this machine lie rather in the means for actuating a swinging carriage differing from the usual type only in the magnitude of its mass and consequent variant characteristics of operation.

Both motors are set in operation at the outset; the saw and oscillating mechanism running idly when the machine is in the position represented by Figure 8. When the treadle 47 is depressed, the hook 53 is raised to the position shown in Figure 5, releasing the carriage 8. At a slightly later moment, the interval of time being provided for by the relative lengths of the levers involved, the eccentric shaft 34 is rotated so as to throw the revolving friction roll 33 into contact with the friction surface of the sector 38 when the latter will be actuated in a counter clockwise direction as considered in that aspect represented in Figures 5 or 8.

The rocker-shaft 6 is thus actuated in a clockwise direction through the pin 41 and variable lever 43, and the carriage 8 in turn thrown forward by the energy transmitted from the rocker-shaft through the lever 44, and link 45 assisted by the extension of the previously compressed spring 17 (Fig. 2).

When no cut is made the carriage meets with only the resistance of the friction of the machine, and a major fraction of the energy thus imparted to the carriage in the form of momentum will be reflected by the spring 9 (Figure 5), and the carriage sent backward at an increased velocity due to the addition during this return stroke of the energy accruing, in the form of momentum, by virtue of the return of the moving masses to their mean equilibrium attained at the approximate attitude of the parts represented in Figure 8.

However, near the limit of the backward stroke, the roller 11 of the dissipating device is engaged by the piece 10 on the carriage and the piston 18 (Figure 2) is depressed. Compression of both the spring 17 and the air contained within the cylinder 12 occurs in consequence.

That energy stored up in the spring 17 is again transformed upon the next forward stroke of the carriage, whilst that spent in compressing the air is largely dissipated in the form of heat conducted through and radiated from the cylinder walls and escaping with the approximately isothermally compressed air through normal piston and valve leakages, this latter displacement being compensated by air drawn into the cylinder through the check valve 14 upon the next forward stroke of the carriage. Another dissipation of energy occurs in the movement of air through the vent 13 (Figures 5 and 8) into and out of the cylinder above the piston.

It will be apparent that the extent of this dissipation of energy will approximately complement that used in making actual cuts through the lumber so that when light stock is cut a great amount of energy will be dissipated in this wise, and when nearly all of the power is utilized in making a cut very much less energy will be thus dissipated since the compression of the air will not be as pronounced nor for so long an interval of time: the spring 17 returning the piston to the top of the cylinder more quickly.

In this wise a more nearly isochronous oscillation of the carriage is insured independent of the uniformity of the stock being worked—providing a valuable element of safety.

When the foot of the operator is removed from the treadle, contact of the friction roll with the sector is broken by the descent of the counterweight 36 from its elevated position cooperating with the fall of the hook 53 to engage the resilient stop 55. When the hook 53 thus engages the carriage it will be evident that the carriage will be confined to very short oscillations removed from the work table, and whose energy will quickly be dissipated by the dissipating device.

The particular form, relative dimensions, configuration and disposition with reference to the direction of the force of gravity, of the sector 38, the variable lever 43, the carriage 8, and cooperating parts provide for several valuable characteristics of operation and construction as follows:

Rigidity of the carriage 8 to insure the permanence of the alignment of the saw with the plane of its oscillatory movement being a primal requirement of machines of this type, and rigidity being had at an expense in weight, the counter-balancing of the carriage ordinarily involves the use of weights expensive to manufacture and ship.

In my invention advantage is taken of the use of various levers to oppose the great weight of the carriage, the magnitude of whose angular movement is relatively little, against the lesser weight of the counterbalance, identical with the sector, having a greater angular movement. However, at the rate of oscillation deemed desirable in practice, the velocity of the sector so geared, and of such dimensions as provide for a practicable pressure between the friction roll 33 and the sector 38, exceeds that possible of retardation by the natural force of gravity in the required time of its reversal of direction of movement. In consequence of this peculiarity it is necessary to provide for the slackening of the speed of the sector considerably before it reaches the limit of its travel.

This characteristic movement is provided for by the variable lever 43 engaging the pin 41 secured to the sector 38; the latter constituting a lever of fixed length. Figure 7 represents two extreme positions of this gearing in the solid and broken lines respectively, wherein the pin 41' is shown to have approached the center of oscillation of the variable lever 43' during the movement from one to the other of the positions represented.

Now, it will be evident that as the velocity of the sector in its upward sweep, at the instance of the descending mass of the carriage, becomes less, a lesser support will be afforded the carriage, allowing it to descend at an accelerated velocity; thereby investing the carriage alone, rather than the whole of the moving system, with a major fraction of the total energy, represented by the backward stroke of the carriage, to be dissipated by the dissipating device without undue hazard to the gearing.

And, also, the carriage, near the limit of this backward position will not be completely counterbalanced and will require the application of energy beyond that required to impart its initial velocity in the forward stroke and manifest in its momentum. This allows a certain control over the velocity of the carriage accruing out of the varying capacities of the friction drive to transmit power governed by the pressure exerted between the friction roll 33 and the sector 38, and hence by the pressure of the operator's foot upon the treadle 47.

These features combined with the special other gearing to permit of locating the bulk of the machine behind the work table, comprising the rocker-shaft 6, lever 44, and link 45 constitutes a device out of which accrue certain manifest advantages in construction, transportation, and utility.

From these characteristics it will be seen that a celerity of movement of this heavier carriage assembly, equal to that of the lighter belt driven machines whose carriages are oscillated by human effort is attained.

Having described my invention what I claim is:

1. In cut-off saw machines having a power oscillated saw carriage, an energy absorbing device to engage said carriage at one limit of its travel, a reflecting spring to engage the said carriage at the other limit of its travel, and an auxiliary means for reflecting the said carriage back against the said energy absorbing device disposed and adapted to engage the said carriage to prevent the passage of the saw blade across the work table when the source of power for oscillating said carriage is disengaged.

2. In cut-off saw machines having a power oscillated saw carriage, a friction roll journalled upon an eccentric spindle to engage a sector geared to said carriage, a hook adapted to engage said carriage to confine its oscillations clear of the work table, and a treadle geared to the said eccentric shaft to rotate the same to cause the engagement of said roll with said sector and to the said hook to disengage it from the said carriage priorly to the engagement of said roll with said sector.

3. In cut-off saw machines, the combination of an oscillatory saw carriage, a relatively light pendulous counterweight arcuately formed and a friction roll adapted to be engaged by said arcuate portion at the will of the operator, and a variable lever formed with a slot engaging a pin fixed in said counterweight, said variable lever being connected to said saw carriage to move angularly therewith.

4. In cut-off saw machines having an oscillatory saw carriage, a counterbalancing system for said carriage comprising a relatively light, pendulous counterweight provided with a pin, and a variable lever connected to oscillate with said carriage and formed with a slot to engage said pin, wherein said engagement of said pin with said slot is disposed between the axes of said variable lever and said counterweight, and fixedly and variably to the axes thereof respectively, though situated at all times in closer proximity to the axis of said counterbalance than to the axis of said variable lever.

5. In cut-off saw machines having an oscillatory saw carriage, the combination of power means for oscillating said saw carriage at the will of the operator, a reflecting spring engaging the said carriage at the end of the working stroke in which it is impelled by said power means, an energy dissipating device engaging said carriage at the end of the return stroke in which it is impelled by force of gravity and the reflected momentum of said saw carriage initially imparted by said power means and a counterbalancing system for said saw carriage comprising a relatively light pendulous counterweight provided with a pin, and a variable lever connected to oscillate with said carriage and formed with a slot to engage said pin wherein said engagement of said pin with said slot is disposed between the axes of said variable lever and said counterweight, and fixedly and variably related to said axes thereof respectively though situated at all times in closer proximity to the axis of said counterbalance than to the axis of said variable lever.

6. In cut-off saw machines having a power actuated oscillatory saw carriage, reflecting spring and energy dissipating device to engage the said carriage at opposite ends of its stroke, a relatively light pendulous counterweight variably geared to said saw carriage through a lever connected to oscillate with said carriage and formed with a slot engaging a pin secured to said counterweight and slidable in said slot wherein said counterweight is formed with an internal frictional surface and a friction roll driven by power means adapted to engage said surface to actuate said saw carriage.

7. In cut-off saw machines having a power actuated oscillatory saw carriage, reflecting spring and energy dissipating device to engage the said carriage at opposite ends of its stroke, a relatively light pendulous counterweight variably geared to said saw carriage through a lever formed with a slot engaging a pin secured to said counterweight and slidable in said slot wherein said counterweight is formed with an internal frictional surface, a power driven friction roll adapted to be engaged or disengaged therewith at the will of the operator, and auxiliary means for reflecting said carriage back against the said energy dissipating device disposed and adapted to engage said carriage to prevent its passage across the work table when said power driven friction roll is disengaged from said internal frictional surface of said counterweight.

8. In cut-off saw machines having a power oscillated saw carriage, the combination of a motor driven friction roll, a sector formed with an internal frictional surface adapted to be engaged and disengaged by said friction roll at the will of the operator, a lever formed with a slot engaging a pin secured to said sector, a rocker shaft to which said lever is rigidly fixed, a second lever also fixed to said rocker shaft and connected to said carriage by a link, wherein the said engagement of said pin with said slot is disposed between the axes of said sector and said lever formed with a slot, and fixedly and variably related thereto respectively to provide for a greater magnitude of angular motion of the former with respect and in opposite direction to the latter.

9. In cut-off saw machines having an oscillatory saw carriage, a system of reflecting devices for said carriage comprising a pair of springs adapted and disposed to being strained by said saw carriage at extreme limits of its travel, an energy dissipating device actuated by said carriage on the return stroke thereof together with one of said pair of springs, and a third reflecting spring disposed upon the carriage adapted to be strained by the engagement of a hook with suitable cooperating parts thereof to confine the oscillation of the said carriage to such a small amplitude of movement as will keep it clear of the work table, said engagement of said hook being effected when the motivating power of said carriage is disconnected therefrom.

10. In cut-off saw machines having a power oscillated saw carriage engaging a system of reflecting springs and an energy dissipating device, an auxiliary elastic means to constrain said saw carriage to such a small amplitude of movement as will keep it clear of the work table, said elastic means being engaged by said carriage subsequently to the disengagement of the power means for impelling the said carriage in its cutting stroke and disengaged priorly to the engagement of said power means with said saw carriage, and wherein the controls for engaging and disengaging both said power means for oscillating the carriage and said auxiliary elastic means for restraining the carriage move in synchronism.

11. A sawing machine comprising, a swinging saw carriage oscillatory between two reflecting devices, an arcuate counterbalance for said carriage, a motor driven friction roll adapted to engage said arcuate counterbalance, and an auxiliary reflecting device to arrest the forward motion of the said carriage when the said friction roll is disengaged from the said arcuate counterbalance.

12. In sawing machines having a swinging saw carriage actuated by power means at the will of the operator, an arcuate counterbalance for the said saw carriage, a friction roll comprised in said power means and means for engaging and disengaging said friction roll with said arcuate counterbalance.

Signed at Portland in the county of Multnomah and State of Oregon this 4th day of March, 1930.

ARTHUR E. DE KONING.